United States Patent
Zhang et al.

(10) Patent No.: US 8,839,016 B2
(45) Date of Patent: *Sep. 16, 2014

(54) USB SELF-IDLING TECHNIQUES

(71) Applicant: Marvell World Trade Ltd., St. Michael (BB)

(72) Inventors: Zhenyu Zhang, Campbell, CA (US); James Kang-Wuu Jan, San Jose, CA (US); Frank Huang, Pleasanton, CA (US); Yong Jiang, San Jose, CA (US); Yui Lin, Cupertino, CA (US); Lite Lo, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/683,056

(22) Filed: Nov. 21, 2012

(65) Prior Publication Data

US 2013/0346777 A1    Dec. 26, 2013

Related U.S. Application Data

(63) Continuation of application No. 12/178,268, filed on Jul. 23, 2008, now Pat. No. 8,321,706.

(60) Provisional application No. 60/951,344, filed on Jul. 23, 2007.

(51) Int. Cl.
*G06F 1/26* (2006.01)
*G06F 1/32* (2006.01)
*G06F 13/38* (2006.01)

(52) U.S. Cl.
CPC ............ *G06F 1/324* (2013.01); *G06F 1/3203* (2013.01); *G06F 1/3253* (2013.01); *Y02B 60/1235* (2013.01); *G06F 13/385* (2013.01); *Y02B 60/32* (2013.01)
USPC .......................................... 713/323; 713/324

(58) Field of Classification Search
USPC ......................................... 713/300, 323, 324
See application file for complete search history.

(56) References Cited

U.S. PATENT DOCUMENTS

| | | |
|---|---|---|
| 5,390,165 A | 2/1995 | Tuch |
| 5,481,733 A | 1/1996 | Douglis et al. |
| 5,617,118 A | 4/1997 | Thompson |

(Continued)

FOREIGN PATENT DOCUMENTS

| | | |
|---|---|---|
| CN | 1140272 | 1/1997 |
| EP | 1847911 | 10/2007 |

(Continued)

OTHER PUBLICATIONS

"Foreign Office Action", Chinese Application No. 200980136849.9, May 24, 2013, 20 Pages.

(Continued)

*Primary Examiner* — Nimesh G Patel
(74) *Attorney, Agent, or Firm* — Wolfe-SBMC

(57) ABSTRACT

USB self-idling techniques are described. In one or more embodiments, a Universal Serial Bus (USB) device comprises one or more modules to communicate via USB and self-idle by presenting an idle mode to a USB host and entering a suspend mode after the idle mode, the suspend mode being entered while the USB host is presented with the idle mode.

20 Claims, 10 Drawing Sheets

(56) References Cited

U.S. PATENT DOCUMENTS

| | | |
|---|---|---|
| 5,673,416 A | 9/1997 | Chee et al. |
| 5,771,356 A | 6/1998 | Leger et al. |
| 5,828,835 A | 10/1998 | Isfeld et al. |
| 5,884,099 A | 3/1999 | Klingelhofer |
| 6,014,722 A | 1/2000 | Rudin et al. |
| 6,092,108 A | 7/2000 | DiPlacido et al. |
| 6,230,277 B1 | 5/2001 | Nakaoka et al. |
| 6,330,626 B1 | 12/2001 | Dennin et al. |
| 6,463,509 B1 | 10/2002 | Teoman et al. |
| 6,564,318 B1 | 5/2003 | Gharda et al. |
| 6,601,167 B1 | 7/2003 | Gibson et al. |
| 6,711,447 B1 | 3/2004 | Saeed |
| 6,756,988 B1 | 6/2004 | Wang et al. |
| 6,823,472 B1 | 11/2004 | DeKoning et al. |
| 6,832,280 B2 | 12/2004 | Malik et al. |
| 7,089,419 B2 | 8/2006 | Foster et al. |
| 7,103,788 B1 | 9/2006 | Souza et al. |
| 7,126,913 B1 | 10/2006 | Patel et al. |
| 7,194,638 B1 | 3/2007 | Larky |
| 7,266,842 B2 | 9/2007 | Foster et al. |
| 7,299,365 B2 | 11/2007 | Evans |
| 7,308,591 B2 | 12/2007 | Dubinsky |
| 7,356,707 B2 | 4/2008 | Foster et al. |
| 7,496,952 B2 | 2/2009 | Edwards et al. |
| 7,571,216 B1 | 8/2009 | McRae et al. |
| 7,596,614 B2 | 9/2009 | Saunderson et al. |
| 7,606,230 B1 | 10/2009 | Cohen et al. |
| 7,774,635 B2 | 8/2010 | Shiota |
| 7,788,670 B2 | 8/2010 | Bodas et al. |
| 7,818,389 B1 | 10/2010 | Chiang et al. |
| 7,873,841 B2 | 1/2011 | Mullis, II et al. |
| 7,995,596 B2 | 8/2011 | Kuila et al. |
| 8,000,284 B2 | 8/2011 | Lott et al. |
| 8,001,592 B2 | 8/2011 | Hatakeyama |
| 8,095,816 B1 | 1/2012 | Chan |
| 8,117,478 B2 | 2/2012 | Liu et al. |
| 8,139,521 B2 | 3/2012 | Mukherjee et al. |
| 8,171,309 B1 | 5/2012 | Poo |
| 8,296,555 B2 | 10/2012 | Chu |
| 8,321,706 B2 * | 11/2012 | Zhang et al. ........... 713/323 |
| 8,327,056 B1 | 12/2012 | Chan et al. |
| 8,443,187 B1 | 5/2013 | Orr |
| 8,443,211 B2 | 5/2013 | Zhao et al. |
| 8,510,560 B1 | 8/2013 | Lambert et al. |
| 8,688,968 B2 | 4/2014 | Chu et al. |
| 2002/0069354 A1 | 6/2002 | Fallon et al. |
| 2002/0087816 A1 | 7/2002 | Atkinson et al. |
| 2003/0014368 A1 | 1/2003 | Leurig et al. |
| 2003/0200453 A1 | 10/2003 | Foster et al. |
| 2003/0200454 A1 | 10/2003 | Foster et al. |
| 2003/0208675 A1 | 11/2003 | Burokas et al. |
| 2003/0236991 A1 | 12/2003 | Letsinger |
| 2004/0125679 A1 | 7/2004 | Kwean |
| 2004/0158669 A1 | 8/2004 | Weng et al. |
| 2004/0257462 A1 | 12/2004 | Goris et al. |
| 2004/0266386 A1 | 12/2004 | Kuo |
| 2005/0033869 A1 | 2/2005 | Cline |
| 2005/0055547 A1 | 3/2005 | Kawamura |
| 2005/0086551 A1 | 4/2005 | Wirasinghe et al. |
| 2005/0108171 A1 | 5/2005 | Bajikar et al. |
| 2005/0138365 A1 | 6/2005 | Bellipady et al. |
| 2005/0156925 A1 | 7/2005 | Fong et al. |
| 2005/0278523 A1 | 12/2005 | Fortin et al. |
| 2006/0072748 A1 | 4/2006 | Buer |
| 2006/0075259 A1 | 4/2006 | Bajikar et al. |
| 2006/0123248 A1 | 6/2006 | Porter et al. |
| 2006/0136735 A1 | 6/2006 | Plotkin et al. |
| 2006/0142906 A1 | 6/2006 | Brozovich et al. |
| 2006/0156390 A1 | 7/2006 | Baugher |
| 2007/0005824 A1 | 1/2007 | Howard |
| 2007/0011445 A1 | 1/2007 | Waltermann et al. |
| 2007/0038866 A1 | 2/2007 | Bardsley et al. |
| 2007/0097904 A1 | 5/2007 | Mukherjee et al. |
| 2007/0189249 A1 | 8/2007 | Gurevich et al. |
| 2007/0234028 A1 | 10/2007 | Rothman et al. |
| 2007/0260905 A1 | 11/2007 | Marsden et al. |
| 2007/0277051 A1 | 11/2007 | Reece et al. |
| 2007/0297606 A1 | 12/2007 | Tkacik et al. |
| 2008/0016313 A1 | 1/2008 | Murotake et al. |
| 2008/0028243 A1 | 1/2008 | Morisawa |
| 2008/0034411 A1 | 2/2008 | Aoyama |
| 2008/0046732 A1 | 2/2008 | Fu et al. |
| 2008/0066075 A1 | 3/2008 | Nutter et al. |
| 2008/0072311 A1 | 3/2008 | Mullick et al. |
| 2008/0104422 A1 | 5/2008 | Mullis et al. |
| 2008/0108322 A1 | 5/2008 | Upp |
| 2008/0120717 A1 | 5/2008 | Shakkarwar |
| 2008/0298289 A1 | 12/2008 | Jeyaseelan |
| 2008/0313462 A1 | 12/2008 | Zhao et al. |
| 2009/0006658 A1 | 1/2009 | Gough |
| 2009/0049222 A1 | 2/2009 | Lee et al. |
| 2009/0199031 A1 | 8/2009 | Zhang |
| 2009/0327608 A1 | 12/2009 | Eschmann et al. |
| 2010/0023747 A1 | 1/2010 | Asnaashari et al. |
| 2010/0058045 A1 | 3/2010 | Borras et al. |
| 2010/0070751 A1 | 3/2010 | Chue |
| 2010/0174934 A1 | 7/2010 | Zhao |
| 2013/0046966 A1 | 2/2013 | Chu |

FOREIGN PATENT DOCUMENTS

| | | |
|---|---|---|
| JP | 08076872 | 3/1996 |
| JP | 09044418 | 2/1997 |
| JP | 10320302 | 12/1998 |
| JP | 2002099502 | 4/2002 |
| JP | 2002215409 | 8/2002 |
| JP | 2004005254 | 1/2004 |
| JP | 2005011120 | 1/2005 |
| JP | 5565778 | 6/2014 |

OTHER PUBLICATIONS

"Foreign Office Action", Japanese Application No. 2011-527899, Aug. 13, 2013, 2 pages.

"Foreign Office Action", Japanese Application No. 2011-544456, Jul. 9, 2013, 6 pages.

"Non-Final Office Action", U.S. Appl. No. 13/863,079, Oct. 1, 2013, 9 pages.

"EP Intent to Grant", European Patent Application No. 09803951.4, May 14, 2013, 13 Pages.

"Foreign Office Action", Japanese Application No. 2011-527899, Apr. 16, 2013, 5 pages.

"Non-Final Office Action", U.S. Appl. No. 13/863,079, Jun. 20, 2013, 10 pages.

"Non-Final Office Action", U.S. Appl. No. 13/657,511, Mar. 28, 2013, 13 pages.

"Notice of Allowance", U.S. Appl. No. 12/541,731, Apr. 2, 2013, 8 pages.

"Extensions to Direct Link Setup (DLS) Comments", IEEE, P802. 11z, Jul. 2009, pp. 1-3.

"Final Office Action", U.S Appl. No. 12/098,254, May 18, 2011, 11 pages.

"Final Office Action", U.S. Appl. No. 12/541,731, May 31, 2012, 11 pages.

"Final Office Action", U.S. Appl. No. 12/178,268, May 25, 2011, 13 pages.

"Final Office Action", U.S. Appl. No. 12/101,668, May 10, 2012, 8 pages.

"Foreign Office Action", European Patent Application No. 09803951.4, May 24, 2012, 3 pages.

"Foreign Office Action", Japanese Application No. 2011-527899, Nov. 6, 2012, 4 pages.

"Non-Final Office Action", U.S. Appl. No. 12/559,987, Nov. 9, 2011, 10 pages.

"Non-Final Office Action", U.S. Appl. No. 12/178,268, Dec. 22, 2010, 10 pages.

"Non-Final Office Action", U.S. Appl. No. 12/541,731, Sep. 4, 2012, 11 pages.

"Non-Final Office Action", U.S. Appl. No. 12/178,268, Dec. 21, 2011, 13 pages.

(56) References Cited

OTHER PUBLICATIONS

"Non-Final Office Action", U.S. Appl. No. 13/333,551, Apr. 6, 2012, 5 pages.

"Non-Final Office Action", U.S. Appl. No. 12/636,558, Jan. 10, 2012, 6 pages.

"Non-Final Office Action", U.S. Appl. No. 12/271,761, Oct. 3, 2011, 6 pages.

"Non-Final Office Action", U.S. Appl. No. 12/101,668, Apr. 5, 2011, 7 pages.

"Non-Final Office Action", U.S. Appl. No. 12/098,254, Jan. 14, 2011, 8 pages.

"Non-Final Office Action", U.S. Appl. No. 12/636,558, May 29, 2012, 8 pages.

"Non-Final Office Action", U.S. Appl. No. 12/101,668, Aug. 9, 2012, 8 pages.

"Non-Final Office Action", U.S. Appl. No. 12/541,731, Oct. 21, 2011, 9 pages.

"Notice of Allowance", U.S. Appl. No. 12/098,254, Dec. 14, 2011, 4 pages.

"Notice of Allowance", U.S. Appl. No. 13/333,551, May 30, 2012, 4 pages.

"Notice of Allowance", U.S. Appl. No. 12/178,268, Jul. 2, 2012, 4 pages.

"Notice of Allowance", U.S. Appl. No. 12/098,254, Sep. 28, 2011, 4 pages.

"Notice of Allowance", U.S. Appl. No. 12/559,987, Jun. 15, 2012, 5 pages.

"Notice of Allowance", U.S. Appl. No. 12/271,761, Jan. 3, 2012, 6 pages.

"Part 11—Wireless LAN Medium Access Control (MAC) and Physical Layer (PHY) Specfications", Information Technology—Telecommunications & Information Exchange Between Systems . . . International Standard, ISO/IEC 8802-11, First Ed., 1999, pp. 1-531.

"PCT Partial Search Report", Application Serial No. PCT/US2008/078343, Partial International Search, Mar. 5, 2009, 2 pages.

"PCT Search Report", Application No. PCT/US2009/056973, Nov. 4, 2009, 13 pages.

"PCT Search Report", Application Serial No. PCT/US2008/078343, May 18, 2009, 5 pages.

"PCT Search Report and Written Opinion", Application No. PCT/US2009/067767, Mar. 26, 2010, 12 pages.

"Restriction Requirement", U.S. Appl. No. 12/101,668, Sep. 22, 2011, 6 pages.

"Supplemental Notice of Allowance", U.S. Appl. No. 13/333,551, Oct. 23, 2012, 2 pages.

"Foreign Office Action", Chinese Application No. 200980153758.6, Apr. 27, 2013, 14 pages.

"Foreign Office Action", European Patent Application No. 09803951.4, Dec. 13, 2012, 6 pages.

"Foreign Office Action", Japanese Application No. 2011-544456, Jan. 29, 2013, 7 pages.

"Notice of Allowance", U.S. Appl. No. 12/636,558, Jan. 9, 2013, 4 pages.

"Notice of Allowance", U.S. Appl. No. 12/101,668, Jan. 11, 2013, 6 pages.

"Supplemental Notice of Allowance", U.S. Appl. No. 12/101,668, Feb. 8, 2013, 4 Pages.

"Foreign Office Action", CN Application No. 200980136849.9, Feb. 7, 2014, 15 Pages.

"Foreign Notice of Allowance", Japanese Application No. 2011-527899, Jan. 28, 2014, 1 Page.

"Foreign Office Action", Japanese Application No. 2011-544456, Dec. 3, 2013, 2 pages.

"Non-Final Office Action", U.S. Appl. No. 13/598,282, Oct. 16, 2013, 6 pages.

"Foreign Office Action", Chinese Application No. 200980153758.6, Dec. 30, 2013, 8 pages.

"Notice of Allowance", U.S. Appl. No. 13/657,511, Nov. 4, 2013, 9 pages.

"Final Office Action", U.S. Appl. No. 13/863,079, May 7, 2014, 7 pages.

"Foreign Decision to Grant", JP Application No. 2011-544456, May 20, 2014, 2 pages.

"Foreign Notice of Allowance", CN Application No. 200980153758.6, Jul. 15, 2014, 4 Pages.

"Foreign Office Action", CN Application No. 200980136849.9, May 19, 2014, 11 Pages.

"Non-Final Office Action", U.S. Appl. No. 13/958,101, Jun. 6, 2014, 14 pages.

"Notice of Allowance", U.S. Appl. No. 13/598,282, May 6, 2014, 4 pages.

* cited by examiner

USB SELF-IDLING TECHNIQUES

RELATED APPLICATION

This present disclosure is a continuation of and claims priority under 35 U.S.C. §119(e) to U.S. Provisional Application Ser. No. 60/951,344, filed on Jul. 23, 2007, and further claims priority to U.S. Utility application Ser. No. 12/178, 268, filed on Jul. 23, 2008, the disclosures of which are both incorporated by reference herein in their entirety. This application is further related to PCT Application Serial No. PCT/US08/78343, filed on Sep. 30, 2008.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure Universal serial buses (USBs) are used by a wide variety of devices to communicate, one with another. For example, a USB may be used in a traditional desktop environment to connect a desktop computer with input devices (e.g., a keyboard and mouse), output devices (e.g., a printer and speakers), storage devices (e.g., a hard disk drive), and so on. In some instances, however, techniques employed by a traditional USB may be inefficient, such as by causing inefficient power consumption which may hinder implementation outside of a traditional desktop environment.

The overhead encountered using a traditional USB suspend/resume protocol may make USB unsuitable for implementations having limited resources, e.g., mobile devices that use a battery, as well as devices that use frequent suspend/resume operations to conserve resources. For example, operation of a traditional wireless local area network (WLAN) device may be suspended for predetermined periods and resumed in order to conserve power, such as to check for network traffic for a period of three milliseconds every 100 milliseconds (ms). Traditional USB suspend/wakeup techniques, however, may add a significant amount of overhead (e.g., time and power) to a suspend/resume operation of the device during each periodic interval. For example, a traditional USB suspend/resume protocol may have a minimum of 30 ms overhead, which may include a 3 ms quiet period for the device to assure that the USB is being suspended, a minimal 5 ms suspended period before wakeup of a host, and a 20 ms resume signal. Further, host driver processing latency may contribute 10 to 50 ms additional overhead. Thus, the amount of time used to perform a traditional USB suspend/resume protocol as well as the amount of power consumed during this performance may make USB unsuitable for mobile applications.

SUMMARY

This summary is provided to introduce subject matter that is further described below in the Detailed Description and Drawings. Accordingly, this Summary should not be considered to describe essential features nor used to limit the scope of the claimed subject matter.

In one or more embodiments, a Universal Serial Bus (USB) device comprises one or more modules to communicate via USB and self-idle by presenting an idle mode to a USB host and entering a suspend mode while still presenting the idle mode to the USB host.

In one or more embodiments, a method comprises self-idling a USB device by presenting an idle mode by the USB device to a USB host and entering a suspend mode from the idle mode while still presenting the idle mode to the USB host.

In one or more embodiments, a USB device comprises a USB physical layer to provide an electrical and mechanical interface to receive and transmit data packets over a USB. The USB device also comprises a USB device controller having a self-idle module to suspend operation of the USB device in less than about one millisecond.

In one or more embodiments, a USB device controller device controller comprises a self-idle module to suspend operation of a USB device without waiting that for a confirmation from a USB host that operation of a USB is being suspended.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
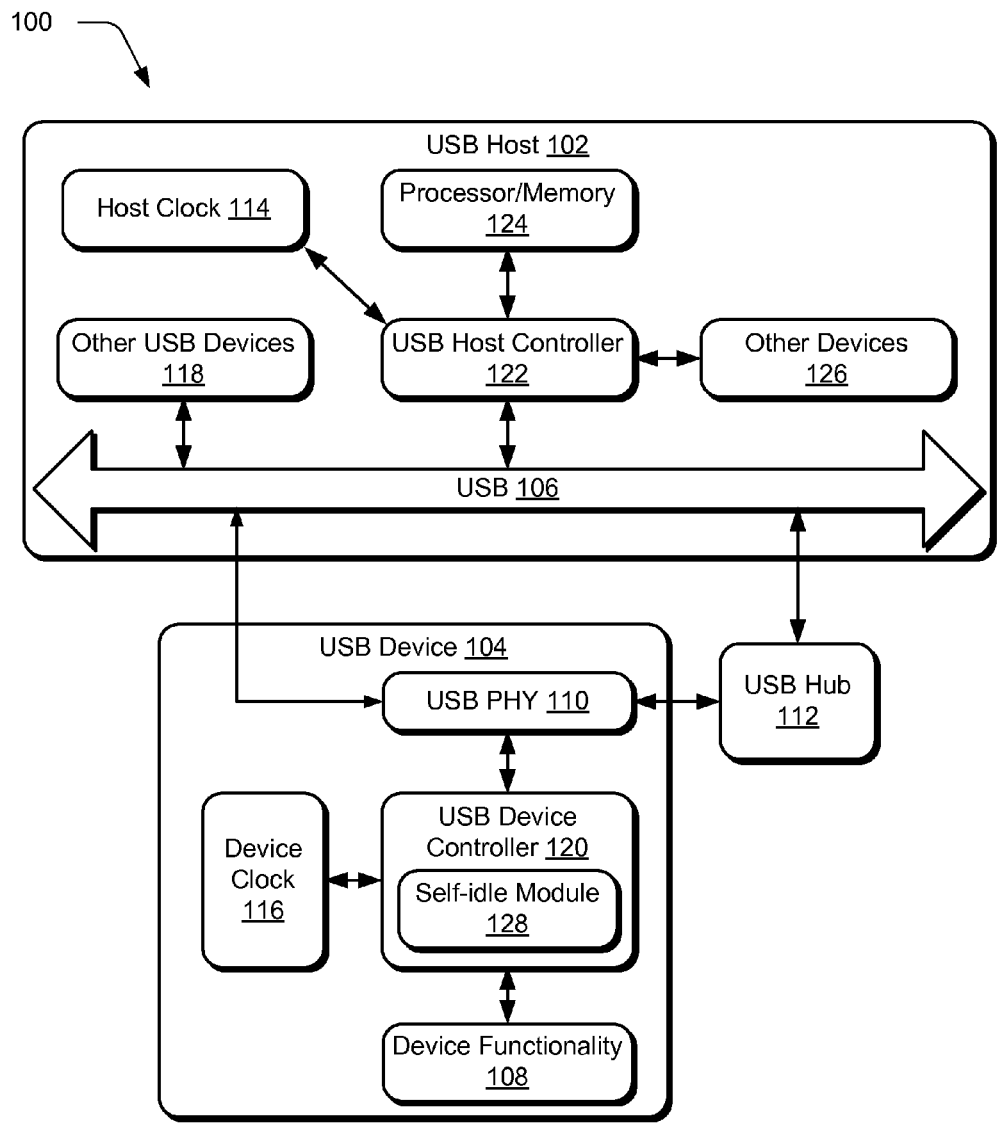
FIG. 1 is an illustration of an example implementation of an environment that includes a universal serial bus (USB) host that is communicatively coupled to a USB device using a USB.

The overhead encountered using a traditional USB suspend/resume protocol may cause designers of mobile devices (e.g., wireless phones, laptop computers, personal digital assistants, and so on) to forgo use of a USB in the mobile devices. For example, use of the traditional USB suspend/resume protocol may involve a significant amount of overhead, such as take a significant amount of time and power. Accordingly, techniques are described in which a USB device is able to "self-idle" thereby reducing the overhead.

In one or more implementations, a USB device may be configured to self-idle by immediately suspending operation rather than engaging in further communication with a host, such as to confirm that operation of the USB is indeed being suspended after a bus quiet time period of three milliseconds. Using this technique, operation of the USB device (e.g., a USB device controller of the USB device) may be suspended in less than about one millisecond. When in the idle mode, the USB bus is quiet and consequently does not have communications traffic. When the USB bus is quiet for more than 3 milliseconds, the USB device may enter a suspend mode. For example, when the USB device self-idles (i.e., enters the idle mode by itself), the USB device may monitor the USB bus activity to detect a USB bus suspend, USB reset and/or a USB power cycle event. The self-idled USB device may move to a suspend mode if a USB bus suspend is detected. Additionally, the self-idled USB device may move to a default mode if a USB bus reset or power cycle event is detected.

In one or more implementations, techniques are also described to resume operation of the USB device without waking a USB host. The USB device, for example, may be connected to a USB host, such as a wireless local area network (WLAN) device that is connected to a personal digital assistant (PDA). The WLAN device may be configured to wake at periodic intervals, in order to, for example, determine whether to resume communication with an access point. However, the WLAN device may not get sufficient power from the USB host during a traditional suspend mode to perform this function. For example, the USB standard mandates that a USB device is to consume less that 2.5 milliamps (mA) during the suspend mode. Therefore, activities that consume more than 2.5 mA may not be performed by a USB device when in the suspend mode. As a result, the USB host will have to be waked in order to gain sufficient power, thereby causing the USB device to encounter the overhead previously described.

Continuing with the previous example, techniques are described in which the WLAN device may make the USB host "think" that the WLAN device has entered an idle mode rather than a suspend mode. When in the idle mode, the USB host provides the WLAN device with operational power (e.g., around about 500 mA current for high bus powered device and 100 mA for a low bus powered device) such that the WLAN device may operate without communicating with the USB host. Therefore, the WLAN device may periodically wake as described above without encountering the overhead of the traditional USB suspend/resume protocol to wake the USB host. Further discussion of the self-idle techniques (including power consumption, device/host communication, and so on) may be found in the following sections.

In the discussion that follows, example operating environments are described that may incorporate the USB self-idling techniques. Example procedures are also described that may be employed in the example operating environments, as well as other environments. Thus, in instances in the discussion of the procedures reference will be made to the environments by way of example. Implementation of the procedures is therefore not limited to the environments.

Example Operating Environment

FIG. 1 illustrates an example implementation of an environment 100 that includes a universal serial bus (USB) host 102 that is communicatively coupled to a USB device 104 using a USB 106. USB 106 follows a "host controlled" topology in which a single host (e.g., USB host 102) is responsible for control of the USB 106, e.g., to undertake transactions and schedule bandwidth. In some implementations, the USB 106 may support a host negotiation protocol such that two or more devices may negotiate for the role of host. For example, the USB host 102 may be configured as a digital camera and the USB device 104 may be configured as a mobile phone that may negotiate for the role of a host. Once a host is determined, the device assuming the role of host is responsible for transactions and bandwidth usage of the USB 106. Further, in one or more implementations the USB host 102 is also responsible for providing power to the USB device 104, although other implementations are contemplated in which each device (e.g., the USB host 102 and the USB device 104) includes a power source.

Accordingly, the USB host 102 may be configured in a variety of ways, such as a desktop computer, server, laptop computer, a peripheral device (e.g., printer), and so on. Likewise, the USB device 104 may also be configured in a variety of ways. For example, device functionality 108 of the USB device 104 may be configured to provide data storage (e.g., a USB data storage dongle), wireless local area network (WLAN) communication, printing (e.g., as a photo printer), image capture (e.g., as a digital camera), input (e.g., as a keyboard or mouse), and so on.

The USB device 104 is illustrated as including a USB physical layer (PHY) 110 to provide an electrical and mechanical interface to receive and transmit data packets over the USB 106. This interface may be achieved directly or indirectly with the USB 106. For example, the USB host 102 may form a physical connection directly with the USB 106 (e.g., plug and socket) or indirectly through use of one or more additional USB hubs, an example of which is illustrated as USB hub 112. Because USB 106 is a hub-based architecture, USB 106 is representative of a first hub while USB hub 112 may be representative of one or more additional hubs through which communication between the USB host 102 and the USB device 104 may be achieved.

USB 106 is a serial bus that uses four shielded wires to form a communicative coupling. Two of the wires are used to provide power, e.g., +5 v and GND. The other two wires (D+ and D−) support twisted pair differential data signals that use a Non Return to Zero Invert (NRZI) encoding scheme to send data with a "sync" field to synchronize host and device clocks 114, 116, one to another.

USB 106 may support a variety of data rates, examples of which include low and full speed modes (e.g., USB 1.1 and 2.0) having data rates of up to 187 kB/s and 1.5 MB/s, respectively; a high-speed mode (e.g., USB 2.0) having data rates of up to 60 MB/s; and a super-speed mode (e.g., prospective USB 3.0) having data rates of up to 600 MB/s.

Through the USB 106, USB device 104 may communicate with the USB host 102, as well as a variety of other devices. For example, the USB host 102 is illustrated in FIG. 1 as including other USB devices 118 that are connected to the USB 106 directly. USB device controller 120, for instance, may negotiate with a USB host controller 122 for use of the USB 106 to communicate with one of the other USB device(s) 118. Once permission is granted, the USB device(s) 118 may communicate with the other USB devices 118 directly via the USB 106. The USB device 118 may also communicate indirectly through the USB host controller 122 with other devices that are not configured for communication via the USB 106, examples of which are illustrated as the processor/memory 124 and other devices 126 of the USB host 102.

The USB device controller 120 is further illustrated as including a self-idle module 128 that is representative of functionality to perform self-idle techniques. In at least one implementation, the self-idle module 128 provides a register control for firmware of the USB device 104 to put at least a part of USB functionality of the USB device 104 into an idle mode in front of one or more upstream USB ports, such as ports included on the USB hub 112 and/or the USB 106. In other words, a port of the USB device 104 may be idled (e.g., made inactive to conserve power) before ports of the USB hub 112 and/or the USB 106 of the USB host 102. This may be performed instead of waiting for confirmation that those upstream ports were idled before idling of the port of the USB device 104, itself. In this way, the USB device 104 may avoid the bus quiet time (e.g., three millisecond quiet period to determine that the USB 106 is indeed suspended) and other overhead encountered using traditional USB suspend techniques.

In at least one implementation, the self-idle module 128 also includes functionality to present an idle mode (e.g., a particular low-speed idle mode such as full-speed idle, high-speed idle and so on according to previous connection mode such as full speed, high speed, and so on) to the USB host 102. The presented idle mode may cause the USB host controller 122, through the USB 106, to provide power to the USB device 104 in an amount that is consistent with the idle mode. For example, the USB standard mandates that less than 2.5 mA are to be consumed by "child" USB devices (e.g., USB device 104) during a suspend mode from a "parent" USB host, e.g., the USB host 102. Therefore, by presenting the idle mode more than 2.5 mA of power may be received by the USB device 104 from the USB host 102, e.g., 500 mA.

Because the USB device 104 is able to receive operational power from the USB host 102, the USB device 104 may operate without waking the USB host 102, thereby conserving overhead and power consumed during the traditional USB suspend/resume protocol. For example, the USB device 104 when configured as a WLAN device may periodically wake to check for traffic without waking the host, further discussion of which may be found in relation to FIGS. 3-4.

The self-idle module 128 may also provide register control to get the USB device controller 120 out of the idle mode and resume USB operation, e.g., to respond to USB tokens from the USB host 102 as well as other USB signals such as resume, bus reset, and so on. Thus, the self-idle module 128 is also representative of functionality to self resume, further discussion of which may be found in relation to the following figure.

Generally, any of the functions described herein can be implemented using one or more modules that are representative of software, firmware (e.g., fixed logic circuitry), manual processing, or a combination of these implementations. These modules are depicted using a set of blocks in FIG. 1 for the sake of simplicity of the figure, each of which may be representative of one or more additional modules. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2.

Figure 2:
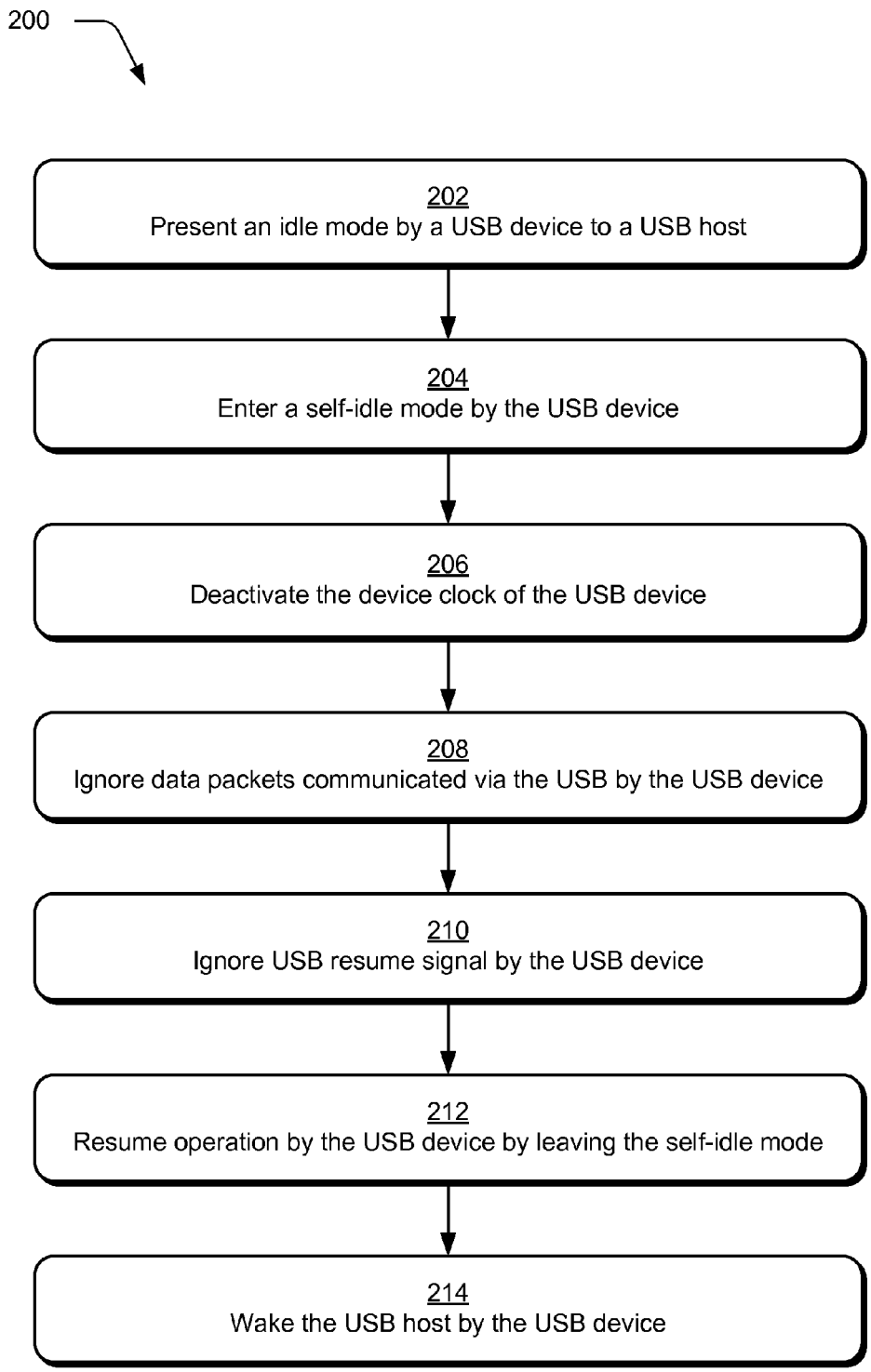
FIG. 2 is a flow diagram depicting a procedure in an example implementation in which a self-idling functionality is described.

FIG. 2 depicts procedure(s) 200 in an example implementation in which a self-idling functionality is described. The following self-idling techniques may be implemented utilizing the previously described systems and devices, as well as other systems and devices. Aspects of each of the procedures may be implemented in hardware, firmware, software, or a combination thereof as previously described. The procedures are shown as a set of blocks that specify operations performed by one or more devices and are not necessarily limited to the orders shown for performing the operations by the respective blocks. In portions of the following discussion, reference will be made to the environment 100 of FIG. 1 by way of example. Such reference is not to be taken as limited to the environment 100 but rather as illustrative of one of a variety of examples.

An idle mode is presented by a USB device to a USB host (block 202). For example, the USB device 104 may cause the differential signal wires (e.g., D+/D−) to enter an idle state, which signals entry into the idle mode. Additionally, the USB device 104 may signal an idle mode that is consistent with a previous operating mode. As previously described, for instance, USB 106 may support a variety of data rates, examples of which include low and full speed modes having data rates of up to 187 kB/s and 1.5 MB/s, respectively; a high-speed mode having data rates of up to 60 MB/s; and a super-speed mode having data rates of up to 600 MB/s. Accordingly, the USB device 104 may signal a corresponding idle mode to the USB host 102, such as low-speed idle, full-speed idle, high-speed idle, and so on.

Traditionally, an idle mode that was entered corresponded to the previous operating mode, e.g., high-speed operating mode to high-speed idle. However, in another implementation, the USB device 104 may signal an idle mode that does not correspond to the previous operating mode to save power. For example, a high-speed idle mode consumes less power than a full-speed idle mode or low-speed idle mode. This is because the full-speed idle mode and the low-speed idle mode may utilize a 15 Kohm pull-down resistor as a detachment detector that draws 220-367 uA. Therefore, in this implementation the USB device 104 may signal a high-speed idle mode regardless of the previous operating mode to conserve additional power.

The USB device 104 also enters a self-idle mode (block 204). The USB device 104 may enter the self-idle mode directly without waiting for confirmation from the USB host 102. For example, the USB device 104 shall enter the self-idle mode directly after explicit confirmation from the USB host 102. Therefore, the USB device 104 may enter the suspend mode in less than one millisecond without experiencing the overhead that is a part of the traditional USB suspend protocol, which mandates that the USB device 104 wait for 3 milliseconds to assure that the USB host 102 does suspend the USB device. The self-idle USB device may then enter a suspend mode from the self-idle mode after 3 milliseconds are spent in the self-idle mode.

In an implementation, the device clock 116 of the USB device 104 is deactivated (block 206) when placed in the self-idle mode. For example, the USB device controller 120 may receive a signal from the self-idle module 128 to suspend operation. The USB device controller 120 may then enter the self-idle mode directly and isolate (e.g., gate off) the device clock 116 to conserve power. The device clock 116 may be implemented in a variety of ways, such as a phase-locked loop (PLL) clock.

When in the self-idle mode, the USB device 104 may ignore data packets communicated via the USB 106 (block 208). In traditional USB, for instance, each USB device exits an idle mode to receive each data packet communicated via the USB, regardless of whether the data packet is intended for the particular USB device. Consequently, a traditional USB device was awakened from a self-idle mode unnecessarily upon receipt of data packets intended for other USB devices. In this implementation, however, the USB device 104 may ignore these non-relevant data packets which are assured by the host before entering the self-idle mode, thus conserving power. Likewise, the self-idled USB device 104 may also ignore USB resume signals (block 210) communicated via the USB 106.

Operation of the USB device 104 may be resumed by leaving the self-idle mode (block 212). The resume operation, for instance, may be initiated by the self-idle module 128 of the USB device 104, itself Consequently, the USB device 104 may operate without communicating with the USB host 102, thereby further conserving power, further discussion of which may be found in relation to FIGS. 3-6.

The resume operation may also be initiated by the USB host 102. The self-idle module 128 of the USB device 104, for instance, may be configured to resume normal operation upon detection of a power cycle event (e.g., a reset) initiated by the USB host 102. This power cycle event may be detected in a variety of ways, such as by VBUS-sensing logic of the USB device 104. The VBUS-sensing logic may be implemented as a part of the USB device controller 120. The logic, for instance, may detect a VBUS power cycle event and forward the event to a power management unit (PMU) located on the integrated circuit(s) that implements the USB device controller 120 to wake up one or more integrated circuits, such as a system-on-chip (SoC) that implement the USB device 104.

The USB host 102 may also be awakened by the USB device 104. (block 214). For example, the USB device 104 may wake the USB host 102 using an out-of-band (OOB) general purpose input output (GPIO) signal rather than an in band USB resume signal as was traditionally utilized as previously described. Thus, the USB host 102 may skip 25 milliseconds of resume signaling that was previously encountered using the traditional USB resume protocol and directly jump to enable the ports of the USB host 102, thereby reducing overhead. Accordingly, the suspend and resume techniques, alone or in combination, may reduce overhead and power consumption of a USB device 104, thereby making USB 106 suitable for a variety of implementations, an example of which may be found in relation to the following figure.

WLAN IMPLEMENTATION EXAMPLE

Figure 3:
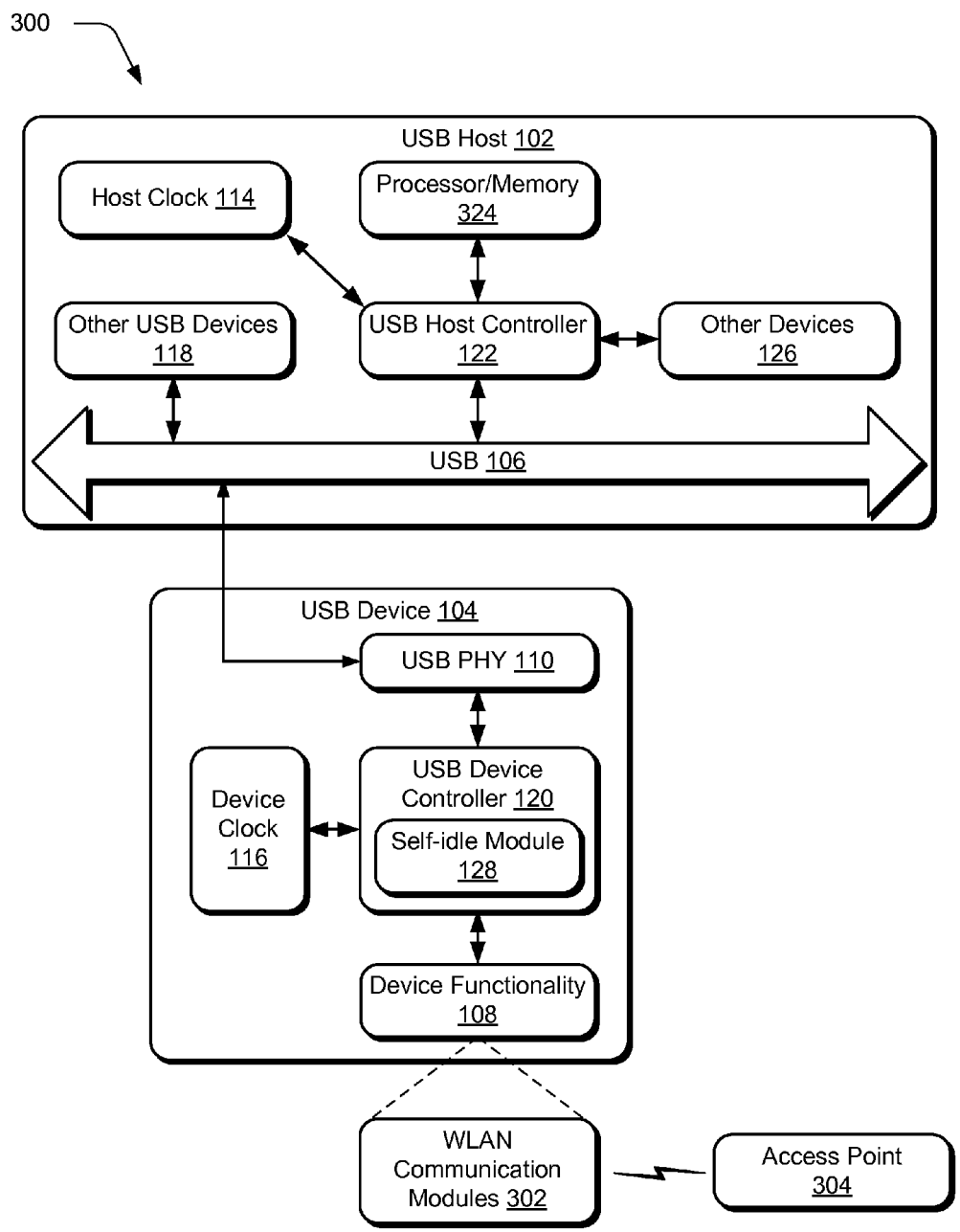
FIG. 3 is an illustration of an example implementation of a system in which the USB device of FIG. 1 is configured to communicate via a wireless network.

FIG. 3 illustrates an example implementation of a system 300 in which the USB device 104 of FIG. 1 is configured to communicate via a wireless network. The USB device 104 of FIG. 3 is illustrated as being configured to communicate over a wireless local area network (WLAN), although other networks are also contemplated.

The device functionality 108 of the USB device 104 is illustrated as implementing one or more WLAN communication modules 302 that are suitable to communicate with an access point 304. The WLAN communication modules 302 may provide a variety of wireless functionality, such as by including an antenna and other hardware, firmware and/or software to transmit and receive data, decrypt data, perform error correction and/or comply with one or more wireless protocols, such as 802.11, WIMAX, and so on.

As previously described, the traditional USB suspend/resume protocol includes a significant amount of overhead and consumes a significant amount of power, thereby making USB less desirable in resource limited situations, such as mobile devices. The self-idling techniques previously described may be used to reduce this overhead and power consumption.

The USB standard, for instance, mandates that a USB "child" consume less than 2.5 mA during a suspend mode. Therefore, the USB device 104 is to wake up the USB host 102 before conducting an activity that uses more than 2.5 mA. Additionally, in traditional USB implementations, the non-suspended USB device 104 always receives packets sent from the USB host 102 even though such packets are intended for other devices. This causes the USB device 104 to unnecessarily consume power since those packets are not relevant to the USB device 104. Further, the traditional USB suspend/resume protocol has at least 30 milliseconds of overhead, which includes a 3 millisecond quiet period for the USB device 104 to assure that the USB 106 is being suspended, a minimum of 5 milliseconds suspend period before waking up the USB host 102 and a 20 millisecond resume signaling period. In addition, processing latency (e.g., by a host drive of the USB host 102) may contribute an additional 10-50 milliseconds of overhead. By employing the self-idling techniques previously described, however, the USB device 104 may efficiently operate in a WLAN environment.

Because the USB host 102 believes that the USB device 104 is in an idle mode, for instance, the USB device 104 is provided with operational power, e.g., more than the 2.5 mA of a suspend mode. Accordingly the USB device 104 may communicate with the access point 304 using the WLAN communication modules 302 without waking the USB host 102, thereby conserving power.

To determine when data packets are available for communication from the access point 304, the self-idle module 128 may employ a polling technique. For example, the self-idle module 128, through the WLAN communication modules 302, may poll the access point 304 at predetermined intervals by waking the USB device 104 from the suspend mode to determine if one or more packets are available for communication from the access point 304. The waking and the determination are performed while still presenting the idle mode to the USB host 102 by the USB device 104, such that the USB host 102 may suspend operation and not wake to perform this polling.

When an instance is encountered in which data is to be communicated from the access point 304 to the USB host 102, the USB device 104 may wake the USB host 102 as previously described. In an implementation, the WLAN communication modules 302 may continue to include a buffer to buffer data received from the access point 304 while the USB host 102 "wakes".

The self-idling techniques may provide further efficiencies when waking the USB host 102. As previously described, the USB device 104 may wake the USB host 102 using an OOB GPIO signal rather than an in-band USB resume signal. Thus, the USB host 102 may avoid twenty-five milliseconds of overhead that were traditionally used to perform "resume signaling" and instead directly jump to enable its ports. Therefore, the USB device 104 may quickly communicate data from the access point 304 to the USB host 102.

Figure 4:
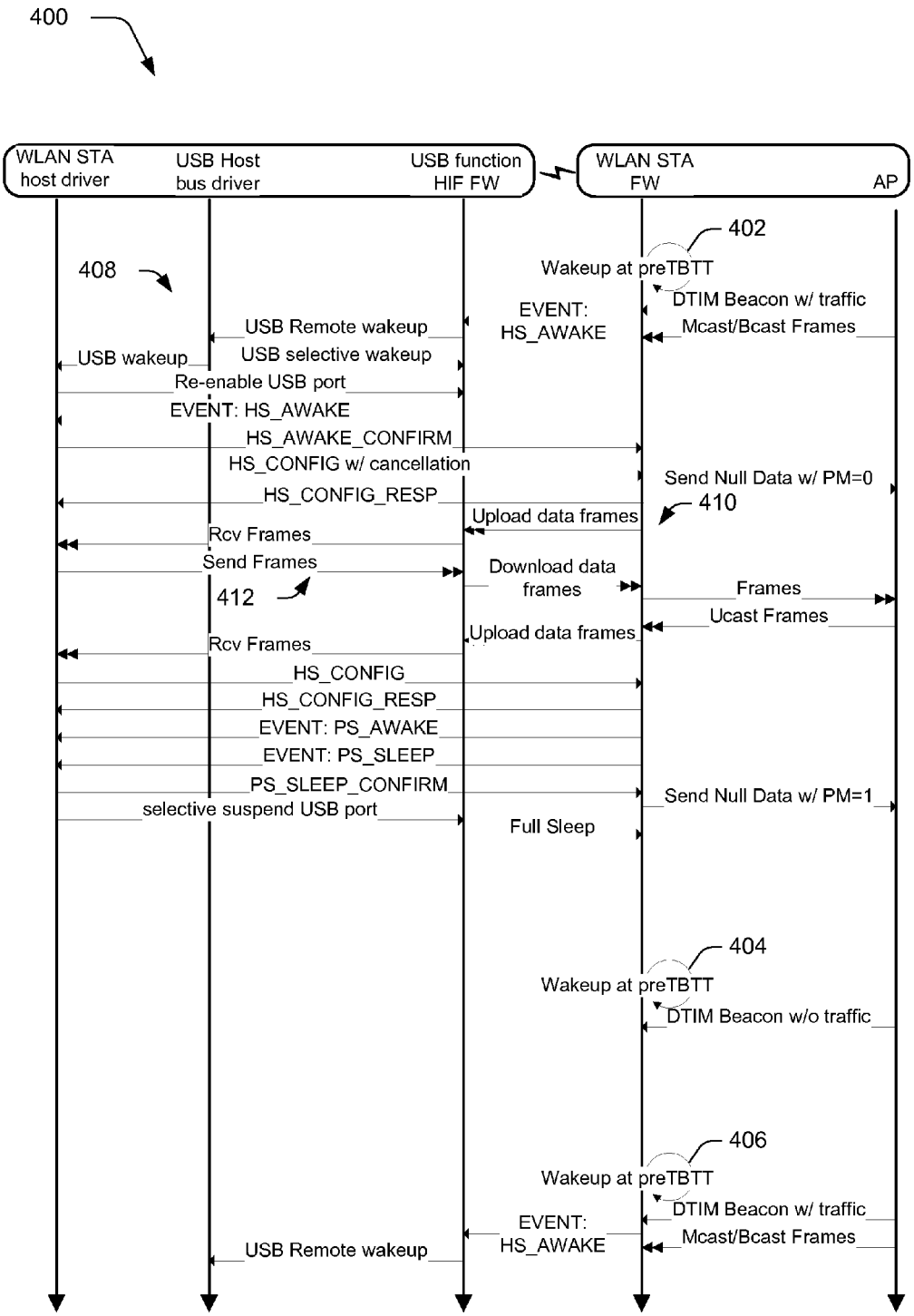
FIGS. 4-6 depict protocols for three different configurations for implementation of WLAN over USB using self-idling techniques.
Figure 5:
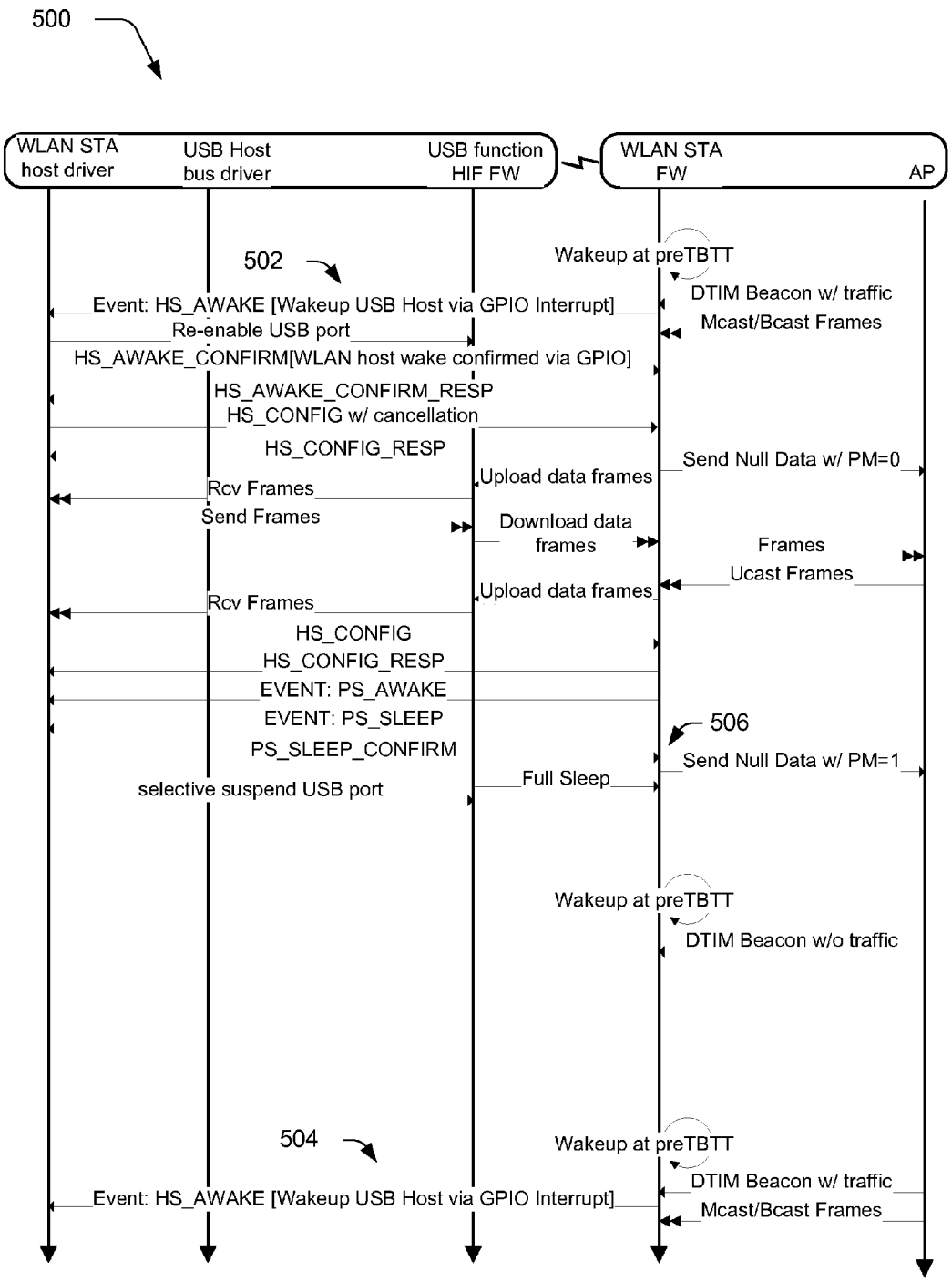
Figure 6:
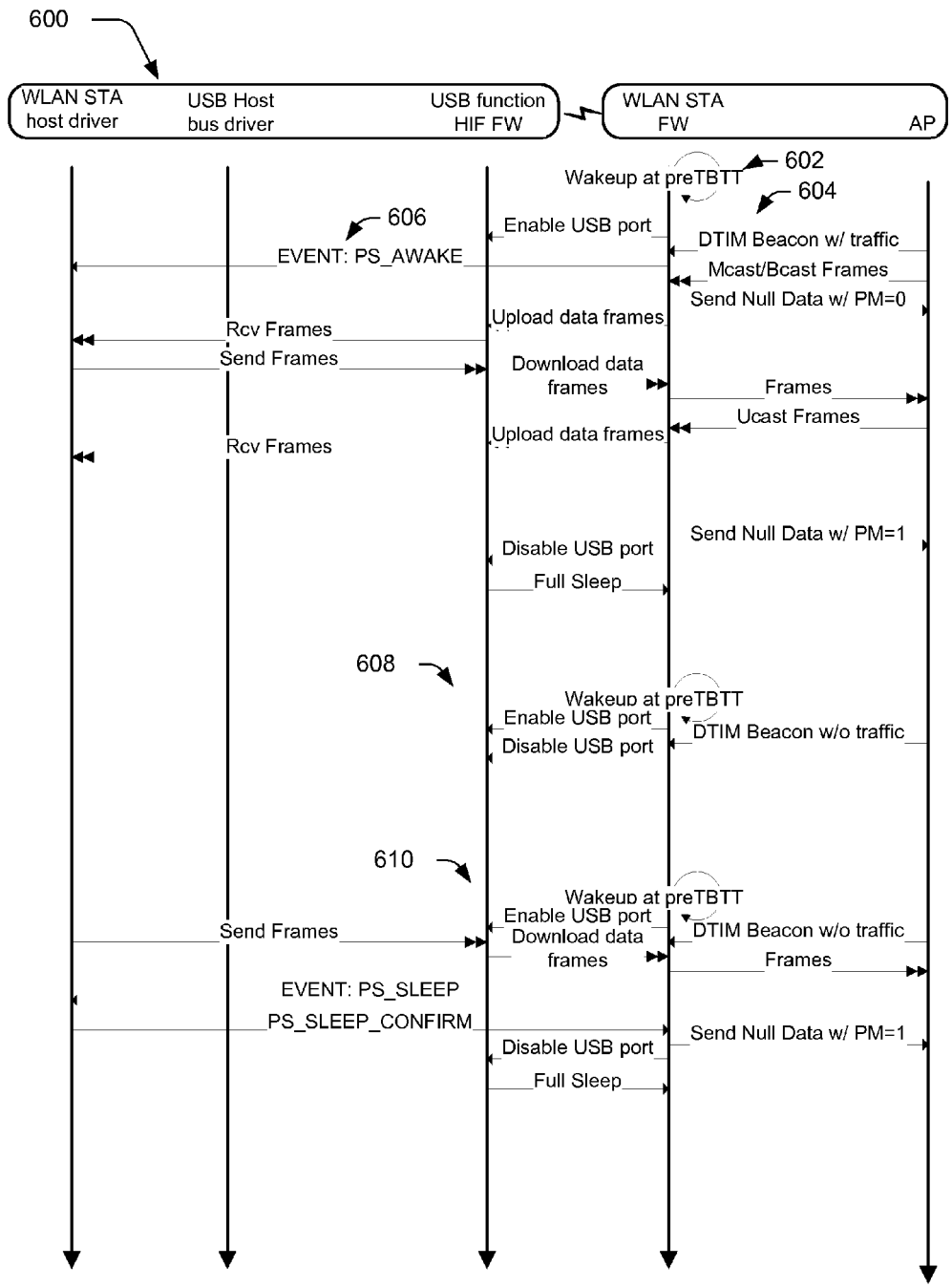

FIGS. 4-6 depict example protocols for three different configurations for implementation of WLAN over USB using the self-idling techniques previously described. The protocol 400 of FIG. 4 is illustrated as depicting communication between a WLAN station host drive, a USB host bus driver, a USB function host interface firmware (depicted as "USB function HIF FW"), WLAN station firmware (depicted as "WLAN STA FW") and an access point, depicted as "AP" in FIG. 4.

The depicted protocol 400 of FIG. 4 is for the USB device 104 when partially USB compliant in that the USB device 104 does not comply with each aspect of the USB specification. For example, the USB device 104 is configured such that the USB host 102 supplies operation power (e.g., 500 mA) and the WLAN station firmware performs an autonomous "wake up" at periodic intervals to poll 402, 404, 406 the access point to determine if data packets are available for communication.

When data packets are available for communication (e.g., after poll 402), the WLAN station firmware initiates a wake up 408 of the USB host to communicate 410 the data packets from the access point to the USB host. Likewise, as shown by the protocol 400, data packets may be communicated 412 from the USB host to the access point. When communication is completed, the USB port of the USB host may be suspended and the USB device may enter the self-idle mode. For example, the USB device may present an idle mode to the USB host 102 to receive operational power and suspend the device clock 116 to actually enter a self-idle mode. After 3 milliseconds are spent in a self-idle mode, the USB device may move into a suspend mode.

When data packets are not available for communication (e.g., poll 404), the USB device 104 may operate without waking the USB host 102. Thus, these techniques may be employed to help the USB host 102 conserve power.

FIG. 5 depicts a protocol 500 for a USB device that employs OOB GPIO signals. The protocol 500 of FIG. 5 uses GPIO signaling 502, 504 to replace a 25 millisecond time period to perform USB resume signaling, thus reducing overhead. Additionally, the USB device 104 in the protocol 500 of FIG. 5 does not wait for a USB suspend condition (e.g., 3 millisecond of "bus quiet" to confirm suspension of the USB bus) but rather enters the self-idle mode upon receipt of the "PS_SLEEP-CONFIRM" 506 indication from the USB host 102.

FIG. 6 depicts a protocol 600 for a USB device that employs resume/suspend self-idling techniques. In this protocol 600, the USB device 104 bypasses traditional USB suspend/resume protocol through self-idling techniques. For example, the USB device may wakeup to poll 602 for traffic from the access point. When traffic is encountered 604 (e.g., there are data packets to be transferred to a USB host), the WLAN station firmware may begin receiving frames and also wakeup the USB host 606. The data frames may then be communicated from the USB host, examples of which are shown using multicast and unicast.

As previously described, the USB device may also operate 608 without waking the USB host, an example of which is illustrated through communication between the WLAN station firmware and the USB function host interface firmware. The USB device may also re-enable 610 the port when the USB host has data to be communicated to the access point.

USB Device/Host Examples

FIGS. 7-14 illustrate some examples of various devices that can each be implemented as any form of a device to implement various embodiments of the previously described techniques. For example, any of the various devices can be implemented as a USB device and/or USB host that employs the above described techniques to self-idle USB ports. Additionally, any of the various devices can be implemented as including components connected using self-idle USB ports. The techniques may be employed within signal processing and/or control functionality of the devices to connect with other components of the described devices and/or within components represented by the signal processing and/or control functionality, examples of which are as follows.

Figure 7:
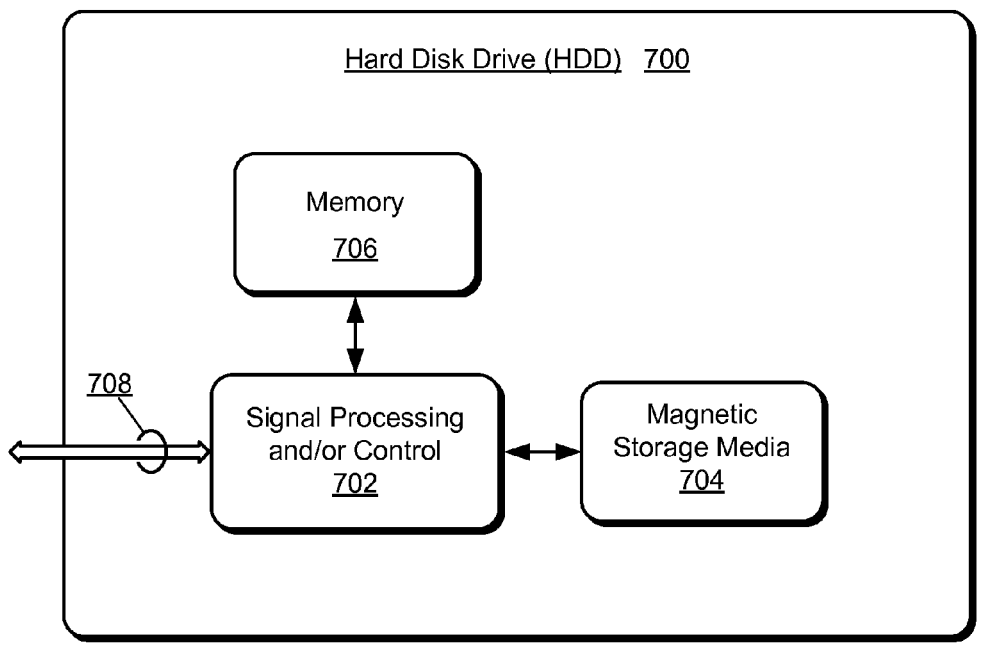
FIGS. 7-14 illustrate some examples of various devices that can each be implemented as any form of a device to implement various embodiments of the previously described techniques.

FIG. 7 illustrates an example device that may be embodied as a hard disk drive (HDD) 700, which includes signal processing and/or control circuit(s) generally identified at 702. The HDD 700 can also include a magnetic storage media 704 and/or a memory 706, such as random access memory (RAM), a low-latency nonvolatile memory such as flash memory, read only memory (ROM), and/or other suitable electronic data storage. In various implementations, the signal processing and/or control circuit(s) 702 can be implemented to process data (e.g., any of encoding, decoding, encryption, and/or decryption), perform data calculations, and/or format data. The data can be output to and/or received from at least the magnetic storage media 704 and/or the memory 706. In addition, the HDD 700 can communicate with a host device (not shown) such as a computer or mobile computing devices, such as a personal digital assistant, cellular phone, media or MP3 player, and/or other devices via one or more wired or wireless communication links 708.

Figure 8:
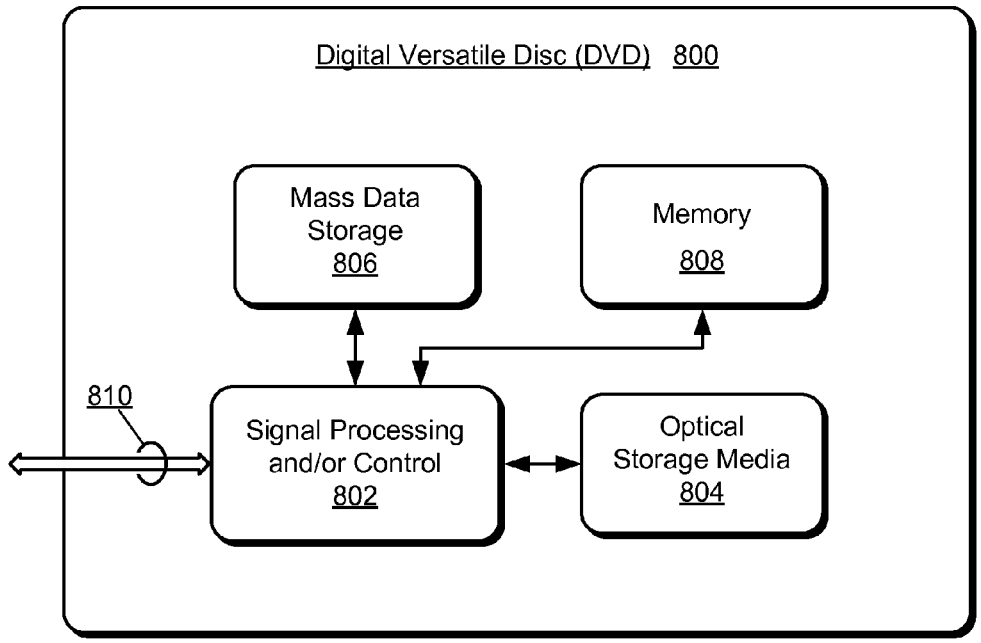

FIG. 8 illustrates an example device that may be embodied as a digital versatile disc (DVD) drive 800, which includes signal processing and/or control circuit(s) generally identified at 802. The DVD 800 can also include an optical storage media 804, mass data storage 806, and/or a memory 808, such as random access memory (RAM), a low-latency nonvolatile memory such as flash memory, read only memory (ROM), and/or other suitable electronic data storage. The mass data storage 806 can store data in a nonvolatile manner, and may include a hard disk drive (HDD) such as described with reference to FIG. 7, which may be a mini HDD that includes one or more platters having a diameter that is smaller than approximately 1.8 inches.

In various implementations, the signal processing and/or control circuit(s) 802 can be implemented to process data (e.g., any of encoding, decoding, encryption, and/or decryption), perform data calculations, format data, and/or any other signal processing functions associated with a DVD drive. The data can be written to and/or read from at least the optical storage media 804 and/or the memory 808. In addition, the DVD 800 can communicate with an output device (not shown) such as a computer, television, and/or other devices via one or more wired or wireless communication links 810.

Figure 9:
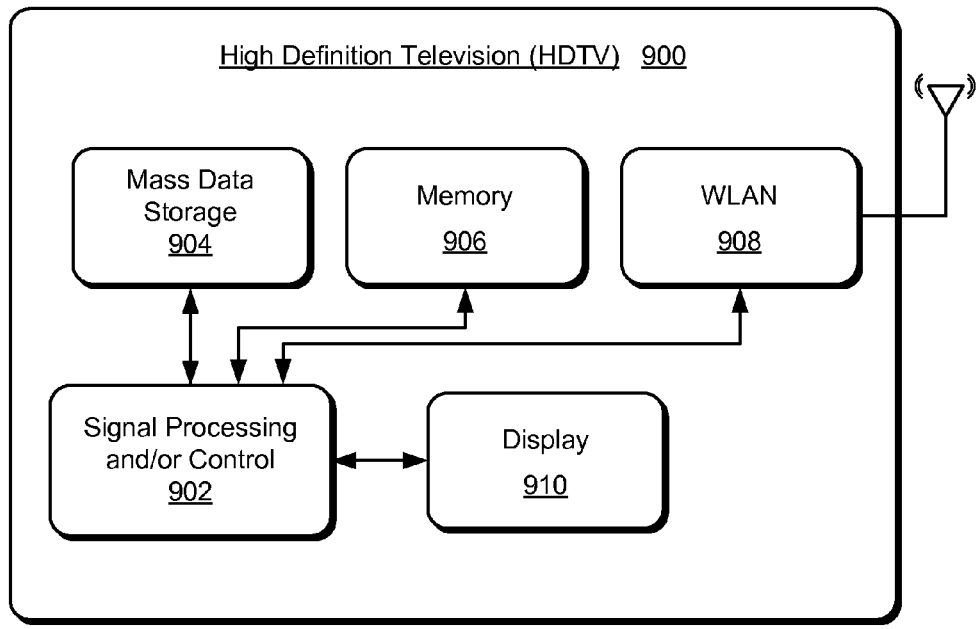

FIG. 9 illustrates an example device that may be embodied as a high definition television (HDTV) 900, which includes signal processing and/or control circuit(s) generally identified at 902. The HDTV 900 can also include mass data storage 904 and/or a memory 906, such as random access memory (RAM), a low-latency nonvolatile memory such as flash memory, read only memory (ROM), and/or other suitable electronic data storage. The mass data storage 904 can store data in a nonvolatile manner, and may include an optical storage media as described with reference to FIG. 8, and/or a drive as described with reference to FIG. 7, which may be a mini HDD that includes one or more platters having a diameter that is smaller than approximately 1.8 inches.

In various implementations, the signal processing and/or control circuit(s) 902 can be implemented to process data (e.g., any of encoding, decoding, encryption, and/or decryption), perform data calculations, format data, and/or any other signal processing functions associated with an HDTV. The data can be output to and/or received from at least the memory 906. In addition, the HDTV 900 includes a wireless local area network (WLAN) interface 908 via which input signals can be received in either a wired or wireless format. HDTV output signals can be generated for a display 910.

Figure 10:
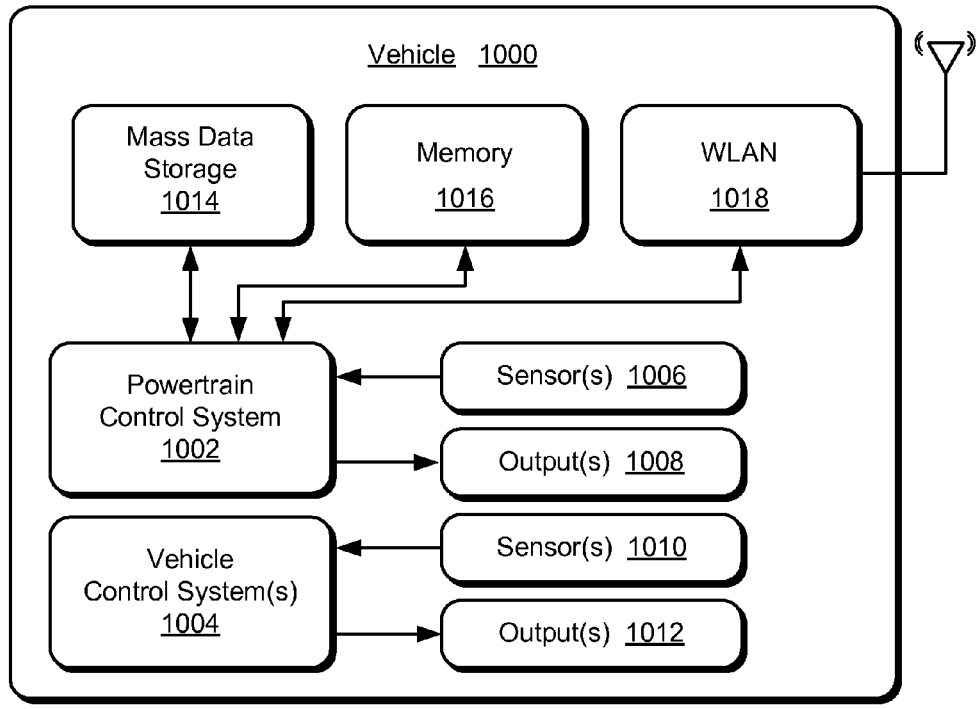

FIG. 10 illustrates an example device that may be embodied as a vehicle 1000, which includes a powertrain control system 1002 and, optionally, additional vehicle control system(s) 1004. The powertrain control system 1002 can receive data inputs from one or more sensors 1006 such as temperature sensors, pressure sensors, rotational sensors, airflow sensors, and/or any other suitable sensors. The powertrain control system 1002 can receive the data inputs and generate one or more output control signals 1008, such as engine operating parameters, transmission operating parameters, and/or other control signals.

Additional control system(s) 1004 may likewise receive data signals from one or more input sensors 1010 and/or generate output control signals 1012 to one or more output devices. In various implementations, a control system 1004 may be part of an anti-lock braking system (ABS), a navigation system, a telematics system, a vehicle telematics system, a lane departure system, an adaptive cruise control system, and/or a vehicle entertainment system such as a stereo, DVD, compact disc, and the like.

The vehicle 1000 can also include mass data storage 1014 and/or a memory 1016, such as random access memory (RAM), a low-latency nonvolatile memory such as flash memory, read only memory (ROM), and/or other suitable electronic data storage. The mass data storage 1014 can store data in a nonvolatile manner, and may include an optical storage media as described with reference to FIG. 8, and/or a drive as described with reference to FIG. 7, which may be a mini HDD that includes one or more platters having a diameter that is smaller than approximately 1.8 inches. In addition, vehicle 1000 includes a wireless local area network (WLAN) interface 1018 via which input signals can be received in either a wired or wireless format. The powertrain control system 1002 also may support connections with a WLAN via the WLAN interface 1018.

Figure 11:
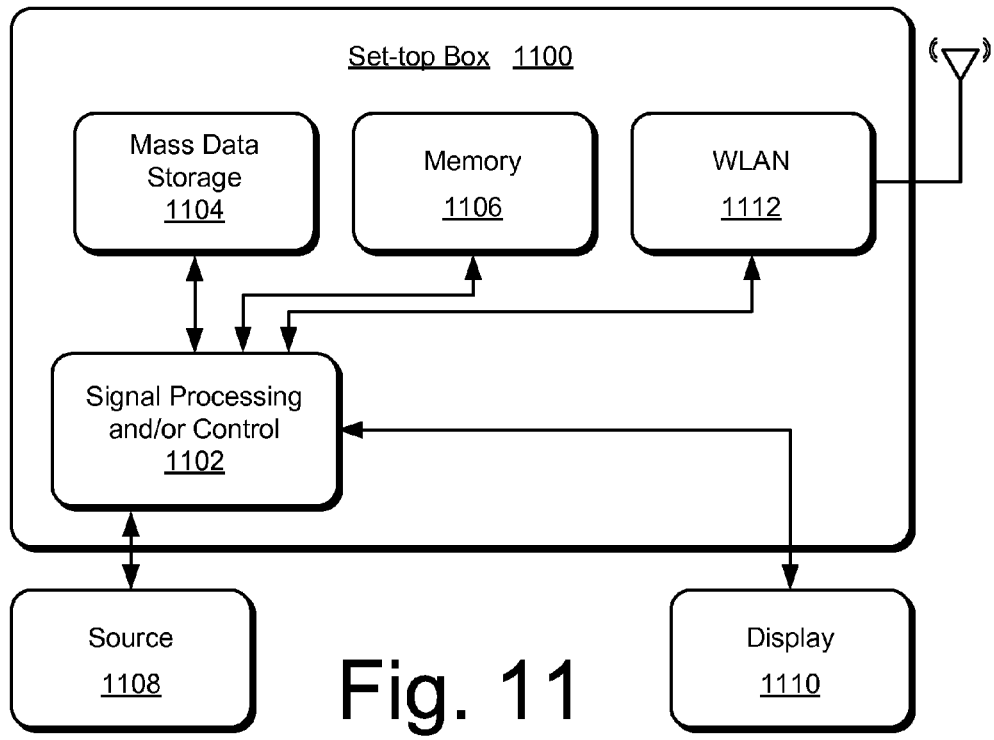

FIG. 11 illustrates an example device that may be embodied as a television set-top box 1100, which includes signal processing and/or control circuit(s) generally identified at 1102. The set-top box 1100 can also include mass data storage 1104 and/or a memory 1106, such as random access memory (RAM), a low-latency nonvolatile memory such as flash memory, read only memory (ROM), and/or other suitable electronic data storage. The mass data storage 1104 can store data in a nonvolatile manner, and may include an optical storage media as described with reference to FIG. 8, and/or a drive as described with reference to FIG. 7, which may be a mini HDD that includes one or more platters having a diameter that is smaller than approximately 1.8 inches.

The set top box 1100 can receive data signals from a source 1108, such as a broadband source, and can then output standard and/or high definition audio/video signals suitable for a display 1110, such as a television, monitor, and/or other video and/or audio output devices. In various implementations, the signal processing and/or control circuit(s) 1102 can be implemented to process data (e.g., any of encoding, decoding, encryption, and/or decryption), perform data calculations, format data, and/or any other signal processing functions associated with a television set-top box. The data can be output to and/or received from at least the memory 1106 and/or the source 1108. In addition, the set-top box 1100 includes a wireless local area network (WLAN) interface 1112 via which input signals can be received in either a wired or wireless format. The set-top box 1100 may also support connections with a WLAN via the WLAN interface 1112.

Figure 12:
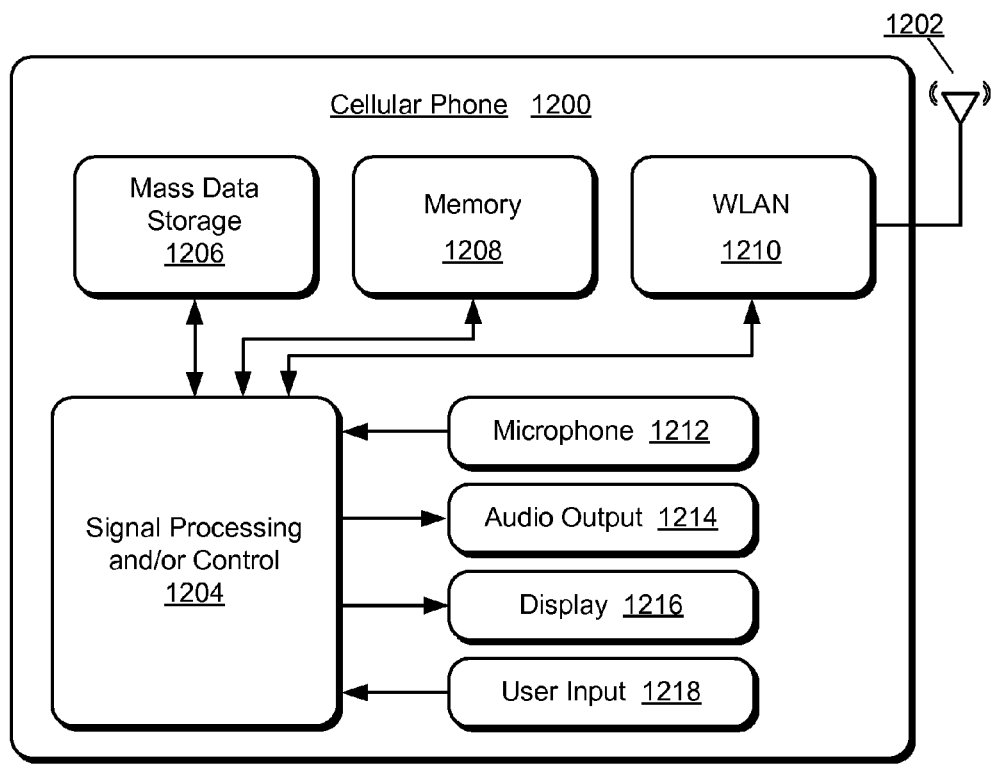

FIG. 12 illustrates an example device that may be embodied as a cellular phone 1200, which includes a cellular antenna 1202 and signal processing and/or control circuit(s) generally identified at 1204. The cellular phone 1200 can also include mass data storage 1206 and/or a memory 1208, such as random access memory (RAM), a low-latency nonvolatile memory such as flash memory, read only memory (ROM), and/or other suitable electronic data storage. The mass data storage 1206 can store data in a nonvolatile manner, and may include an optical storage media as described with reference to FIG. 8, and/or a drive as described with reference to FIG. 7, which may be a mini HDD that includes one or more platters having a diameter that is smaller than approximately 1.8 inches.

In various implementations, the signal processing and/or control circuit(s) 1204 can be implemented to process data (e.g., any of encoding, decoding, encryption, and/or decryption), perform data calculations, format data, and/or any other signal processing functions associated with a cellular phone. The data can be output to and/or received from at least the memory 1208. In addition, the cellular phone 1200 includes a wireless local area network (WLAN) interface 1210 via which input signals can be received in a wireless format. The cellular phone 1200 may also support connections with a WLAN via the WLAN interface 1210. In some implementations, the cellular phone 1200 can include a microphone 1212, an audio output 1214 such as a speaker and/or audio output jack, a display 1216, and/or an input device 1218 such as a keypad, pointing device, voice actuation, and/or other input device.

Figure 13:
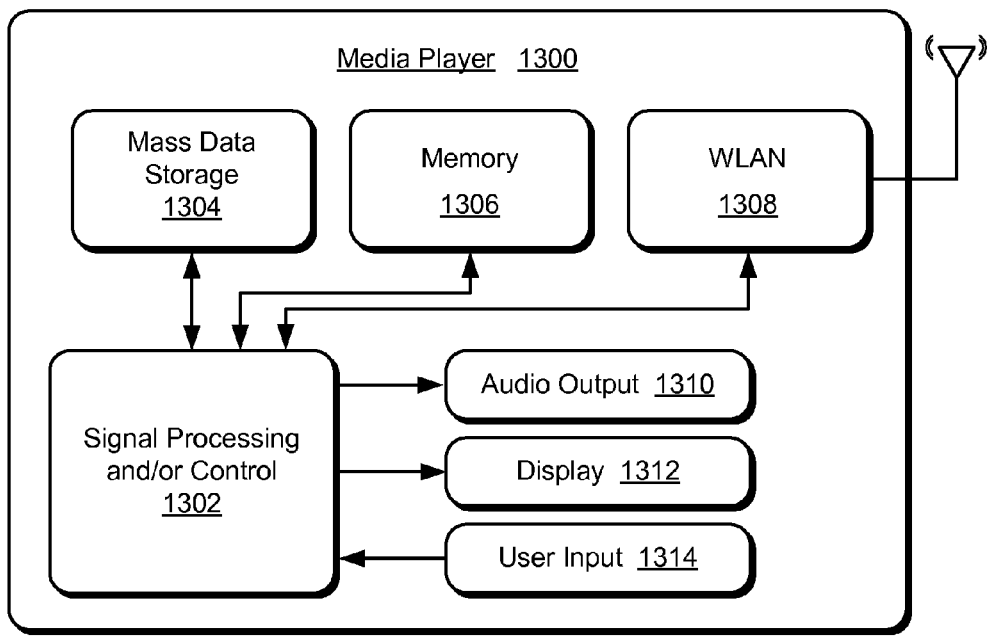

FIG. 13 illustrates an example device that may be embodied as a media player 1300, which includes signal processing and/or control circuit(s) generally identified at 1302. The media player 1300 can also include mass data storage 1304 and/or a memory 1306, such as random access memory (RAM), a low-latency nonvolatile memory such as flash memory, read only memory (ROM), and/or other suitable electronic data storage. The mass data storage 1304 can store data, such as compressed audio and/or video content, in a nonvolatile manner. In some implementations, compressed audio files include files that are compliant with an MP3 format or other suitable compressed audio and/or video formats. The mass data storage 1304 may include an optical storage media as described with reference to FIG. 8, and/or a drive as described with reference to FIG. 7, which may be a mini HDD that includes one or more platters having a diameter that is smaller than approximately 1.8 inches.

In various implementations, the signal processing and/or control circuit(s) 1302 can be implemented to process data (e.g., any of encoding, decoding, encryption, and/or decryption), perform data calculations, format data, and/or any other signal processing functions associated with a media player. The data can be output to and/or received from at least the memory 1306. In addition, the media player 1300 includes a wireless local area network (WLAN) interface 1308 via which input signals can be received in either a wired or wireless format. The media player 1300 may also support connections with a WLAN via the WLAN interface 1308. In some implementations, the media player 1300 can include an audio output 1310 such as a speaker and/or audio output jack, a display 1312, and/or an input device 1314 such as a keypad, touchpad, pointing device, voice actuation, and/or other input device. In various implementations, media player 1300 may employ a graphical user interface (GUI) that typically includes menus, drop down menus, icons, and/or a point-and-click interface via display 1312 and/or user input 1314.

Figure 14:
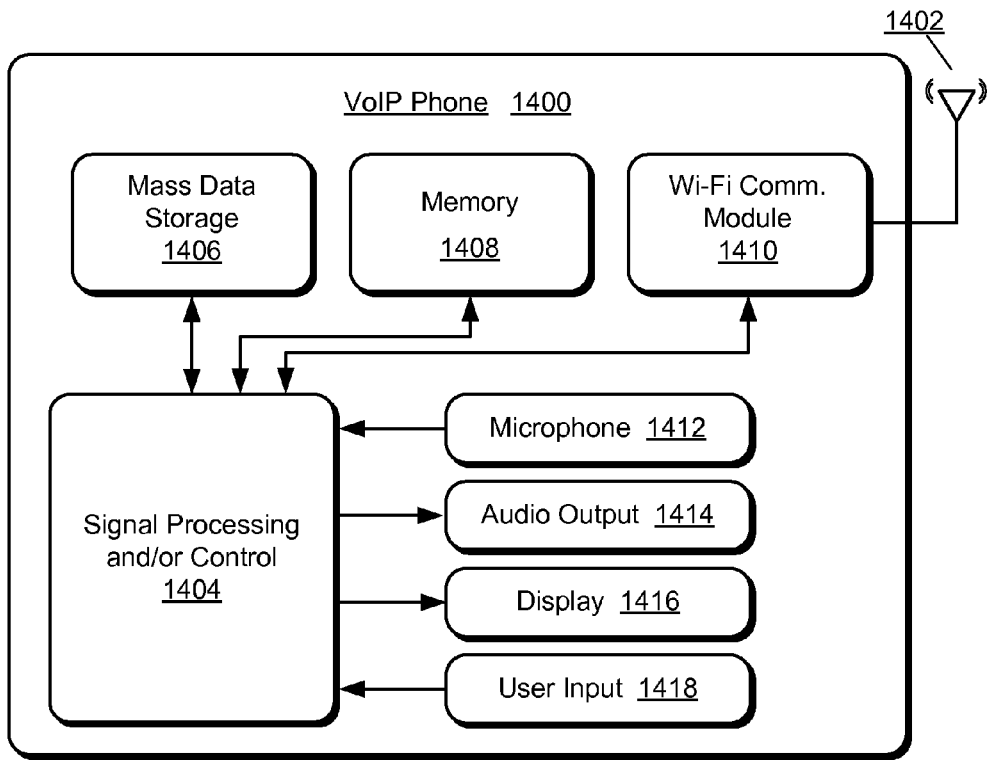

FIG. 14 illustrates an example device that may be embodied as a Voice over Internet Protocol (VoIP) phone 1400, which includes an antenna 1402 and/or is implemented in connection with a VoIP box that enables a conventional telephone to be plugged in and utilized with VoIP technology. The VoIP phone 1400 also includes signal processing and/or control circuit(s) generally identified at 1404. The VoIP phone 1400 can also include mass data storage 1406 and/or a memory 1408, such as random access memory (RAM), a low-latency nonvolatile memory such as flash memory, read only memory (ROM), and/or other suitable electronic data storage. The mass data storage 1406 can store data in a nonvolatile manner, and may include an optical storage media as described with reference to FIG. 8, and/or a drive as described with reference to FIG. 7, which may be a mini HDD that includes one or more platters having a diameter that is smaller than approximately 1.8 inches.

In various implementations, the signal processing and/or control circuit(s) 1404 can be implemented to process data (e.g., any of encoding, decoding, encryption, and/or decryption), perform data calculations, format data, and/or any other signal processing functions associated with a VoIP phone. The data can be output to and/or received from at least the memory 1408. In addition, the VoIP phone 1400 includes a Wireless Fidelity (Wi-Fi) communication module 1410 via which communication links with a VoIP network can be established. In some implementations, the VoIP phone 1400 can include a microphone 1412, an audio output 1414 such as a speaker and/or audio output jack, a display 1416, and/or an input device 1418 such as a keypad, pointing device, voice actuation, and/or other input device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims

What is claimed is:

1. A Universal Serial Bus (USB) device including a USB device controller configured to:
   communicate via a USB bus with a USB host capable of providing current to the USB device; and
   present a first mode to the USB host and enter a second mode while presenting the first mode to the USB host by deactivating a clock device of the USB device, causing the USB device to ignore data packets communicated via the USB bus while in the second mode, and monitoring a power bus line of the USB bus effective to enable the USB device controller to detect a power cycle event on the USB bus.

2. The USB device of claim 1, wherein:
   the first mode is an idle mode;
   the second mode is a suspend mode; and
   the presenting of the idle mode includes idling differential signal lines of the USB bus and is effective to prevent the USB host from limiting the current provided to the USB device to less than 100 mA while in the suspend mode.

3. A USB device as described in claim 1, wherein the second mode is entered in less than 3 milliseconds of presenting the first mode effective to avoid latency associated with a USB suspend protocol.

4. A USB device as described in claim 1, wherein the presenting of the first mode is effective to cause the USB host to provide about 500 mA of current to the USB device if the USB host is a high-power USB host or to provide about 100 mA of current to the USB device if the USB host is a low-power USB host.

5. A USB device as described in claim 1, wherein the presenting of the first mode is effective to cause the USB host to provide more than 2.5 mA of current to the USB device and enable the USB device to consume more than 2.5 mA of current while in the second mode.

6. A USB device as described in claim 1, wherein:
   the clock device of the USB device is a phase-locked loop (PLL) clock; and
   the entering of the second mode causes deactivation of the PLL clock.

7. A USB device as described in claim 1, wherein the entering of the second mode is effective to cause the USB device to monitor only the voltage supply line of the USB bus.

8. A USB device as described in claim 1, wherein the first mode presented to the USB host corresponds to high-speed operating mode instead of a full-speed or low-speed operating mode previously presented by the USB device.

9. A USB device as described in claim 1, wherein the USB device controller is further configured to cease to self-idle by leaving the second mode in response to the power cycle event.

10. A USB device as described in claim 1, wherein the USB device controller is further configured to cease to self-idle by leaving the second mode in response to reset of the USB bus.

11. A USB device as described in claim 1, wherein the USB device controller is further configured to wake the USB host using an out-of-band (OOB) signal or a general purpose input output (GPIO) signal.

12. A USB device as described in claim 1, wherein the USB device controller is further configured to:
   communicate with an access point over a wireless local area network; and
   poll the access point at predetermined intervals by waking the USB device from the second mode to determine if one or more packets are available for communication from the access point, wherein the waking and the determining are performed while the USB device continues to present the first mode to the USB host.

13. A method comprising:
   presenting, at a port of a Universal Serial Bus (USB) device, a first mode to a USB host; and
   causing the USB device to enter a second mode while presenting the first mode to the USB host, wherein:
   causing the USB device to enter the second mode includes deactivating a clock device of the USB device and causing the USB device to ignore data packets communicated via the USB while in the second mode.

14. The method of claim 13, wherein:
   the first mode is an idle mode;
   the second mode is a suspend mode; and
   the presenting of the idle mode includes idling differential signal lines of the USB bus and is effective to prevent the USB host from limiting the current provided to the USB device to less than 100 mA while in the suspend mode.

15. A method as described in claim 13, wherein the USB host is a high-power USB host and the presenting of the high-speed first mode is effective to cause the USB host to provide more than 2.5 mA of current to the USB device.

16. A method as described in claim 13, wherein the clock device of the USB device is a phase-locked loop (PLL) clock and entering the second mode causes deactivation of the PLL clock.

17. A method as described in claim 13, wherein the entering of the second mode further includes monitoring a power bus line of the USB bus effective to enable the USB device controller to detect a power cycle event on the USB bus.

18. A method as described in claim 13, wherein causing the USB device to ignore packets communicated via the USB bus includes causing the USB device to ignore a USB resume signal.

19. A method as described in claim 13, further comprising causing the USB device to leave the second mode in response to a power cycle event or in response to a reset of the USB bus.

20. A method as described in claim 13, further comprising:
   providing a communicative association with an access point over a wireless local area network (WLAN); and
   polling the access point at predetermined intervals by causing the USB device to wake from the second mode to determine if one or more packets are available for communication from the access point, wherein the waking and the determining are performed while the USB device is presenting the high-speed first mode to the USB host.

* * * * *